(12) United States Patent
Ewald et al.

(10) Patent No.: US 11,254,056 B2
(45) Date of Patent: Feb. 22, 2022

(54) FEEDING MECHANISMS FOR 3D PRINTERS

(71) Applicant: HEWLETT-PACKARD DEVELOPMENT COMPANY, L.P., Houston, TX (US)

(72) Inventors: Brent Ewald, Vancouver, WA (US); John Geile, Vancouver, WA (US); Tristan Dudik, Vancouver, WA (US); Michael Rode, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 767 days.

(21) Appl. No.: 16/076,122

(22) PCT Filed: Jul. 25, 2017

(86) PCT No.: PCT/US2017/043751
§ 371 (c)(1),
(2) Date: Aug. 7, 2018

(87) PCT Pub. No.: WO2019/022720
PCT Pub. Date: Jan. 31, 2019

(65) Prior Publication Data
US 2021/0197470 A1    Jul. 1, 2021

(51) Int. Cl.
*B29C 64/321* (2017.01)
*B33Y 30/00* (2015.01)
(Continued)

(52) U.S. Cl.
CPC ............ *B29C 64/321* (2017.08); *B22F 12/52* (2021.01); *B33Y 30/00* (2014.12); *B33Y 40/00* (2014.12)

(58) Field of Classification Search
CPC ....... B29C 64/321; B33Y 30/00; B33Y 40/00; B22F 12/52
See application file for complete search history.

(56) References Cited

U.S. PATENT DOCUMENTS

| 5,340,433 A | 8/1994 | Crump |
| 6,046,426 A | 4/2000 | Jeantette et al. |

(Continued)

FOREIGN PATENT DOCUMENTS

| CN | 103640221 A | 3/2014 |
| CN | 205310832 U | 6/2016 |

(Continued)

*Primary Examiner* — Yung-Sheng M Tsui
(74) *Attorney, Agent, or Firm* — HP Inc. Patent Department

(57) ABSTRACT

In order to have ensure a proper dosing of a 3D printing system, it is disclosed a feeding mechanism for feeding build material to a surface that comprises: a receptacle to receive build material; and an outlet of the build material having a substantially quadrilateral opening with a first dimension and a second dimension orthogonal to one another; the outlet further comprising a third dimension orthogonal to the first dimension and the second dimension defining the height of the outlet, and the feeding mechanism being to selectively feed build material from the receptacle through the outlet onto a surface as the feeding mechanism moves along a travel direction over the surface, being such travel direction parallel to the first dimension of the outlet, the feeding mechanism further comprising an actuator to modify the magnitude of at least one of the second dimension or the third dimension outlet.

15 Claims, 3 Drawing Sheets

(51) Int. Cl.
*B33Y 40/00* (2020.01)
*B22F 12/52* (2021.01)

(56) References Cited

U.S. PATENT DOCUMENTS

| | | |
|---|---|---|
| 9,446,558 B2 | 9/2016 | Chang |
| 9,486,962 B1 | 11/2016 | Dugan et al. |
| 2016/0059308 A1 | 3/2016 | Volk |
| 2016/0230283 A1 | 8/2016 | Tseliakhovich et al. |

FOREIGN PATENT DOCUMENTS

| | | | |
|---|---|---|---|
| DE | 102015003372 | 9/2016 | |
| DE | 102015003372 A1 * | 9/2016 | ............. B05C 19/04 |
| EP | 3117982 A1 | 1/2017 | |
| EP | 3117982 B1 * | 12/2019 | ........... B29C 64/209 |
| WO | 03026876 A2 | 4/2003 | |
| WO | WO-2013/092757 | 6/2013 | |

\* cited by examiner

FEEDING MECHANISMS FOR 3D PRINTERS

BACKGROUND

Additive manufacture systems, commonly known as three-dimensional (3D) printers, enable objects to be generated on a layer-by-layer basis. Powder-based 3D printing systems, for example, form successive layers of a build material in a printer and selectively solidify portions of the build material to form layers of the object or objects being generated.

3D printing systems may comprise mechanisms for accurately measuring the amount of powder to be used in each of the successive layers in order to help ensure that each layer has an appropriate amount of powder and that the conditions of the system, such as layer temperature, are suitable.

BRIEF DESCRIPTION OF THE DRAWINGS

Examples will now be described, by way of non-limiting example only, with reference to the accompanying drawings, in which.

DETAILED DESCRIPTION

Figure 1A:
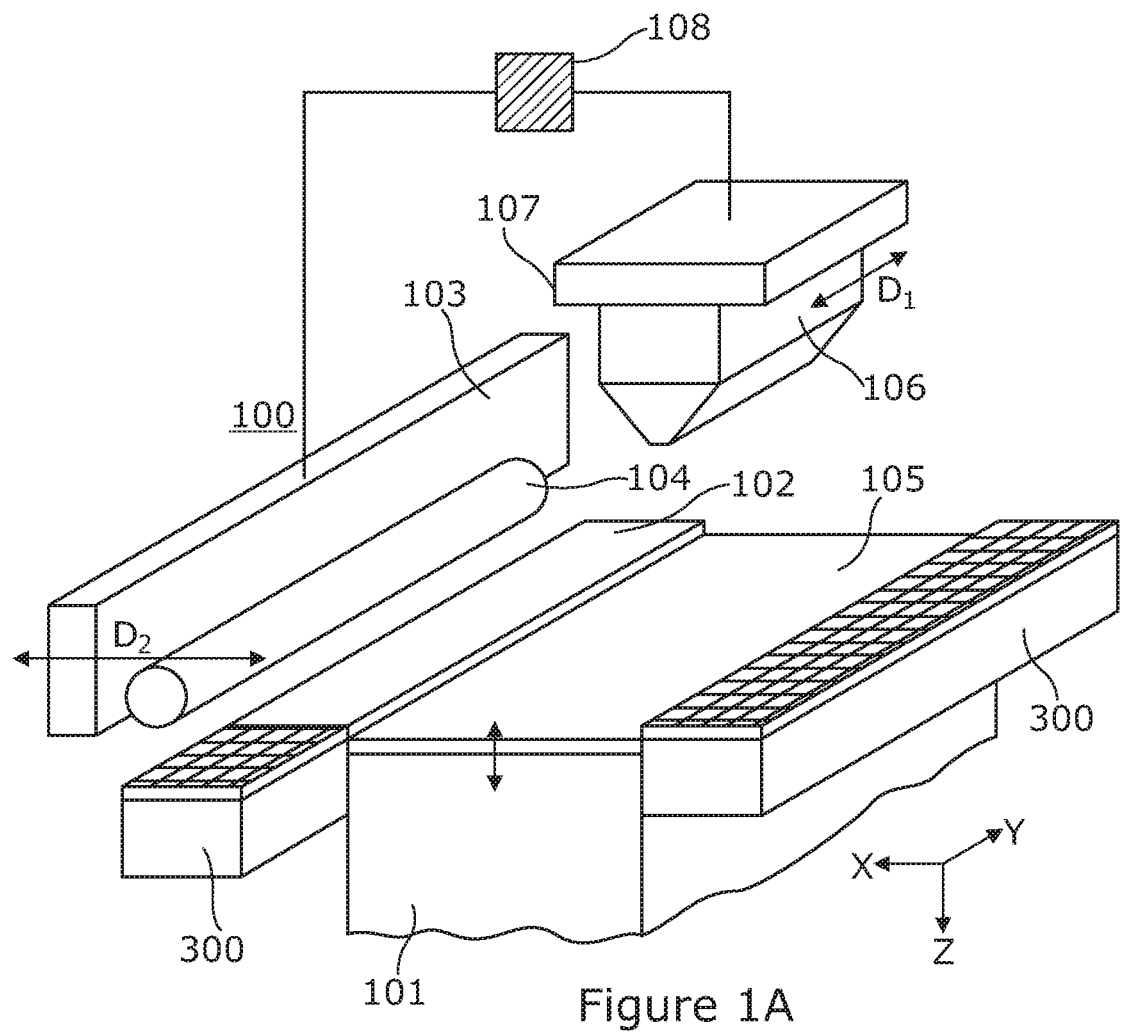
FIG. 1A shows an isometric view of a 3D printing system according to one example.
Figure 1B:
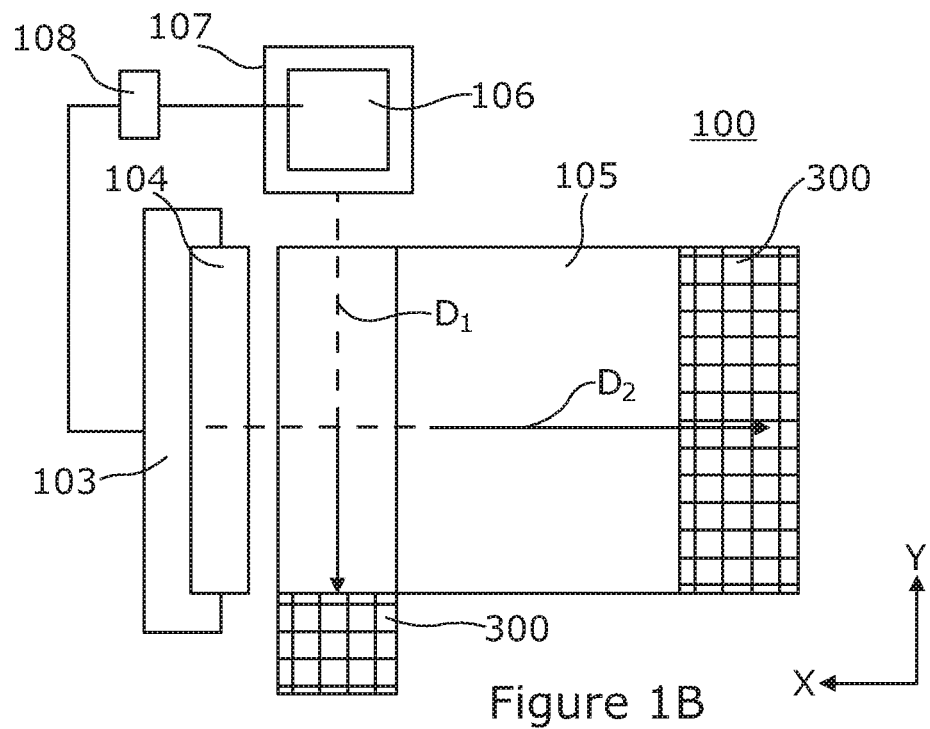
FIG. 1B shows a top view of the 3D printing system of FIG. 1A.

Referring to FIGS. 1A and 1B, schematic views are shown of part of a 3D printing system according to one example.

In particular, FIGS. 1A and 1B show, respectively, isometric and top views of a 3D printing system 100 comprising a spreader 104, attached to a carriage 103. Furthermore, a build surface 105 is shown wherein a determined amount of build material is to be spread by the spreader 104 to generate a layer of build material, either over the build surface 105 or over a previously processed layer of build material. The build material is spread by means of the spreader 104 mounted on a first carriage 103 which is shown in the figures as a roller but can be any device capable of conveying powdered material such as, for example, a wiper.

In one example, the build surface 105 may be part of a build unit 101 that forms a build chamber. In one example the build unit may be removable from the other components of the 3D printing system. The 3D printing system 100 forms 3D objects within the build chamber as it selectively solidifies portions of each formed layer of build material. After each layer of build material is selectively solidified the build surface 105 is lowered, along the z-axis, to enable a new layer of build material to be formed thereon. Depending on the particular 3D printing system used, each layer of build material formed may have a height, for example, in the region of about 50 to 120 microns.

Furthermore, the system may comprise at least one auxiliary platform that can be used for support processes, such as the dosing of the build material or the processing of excess build material. In particular, the system of FIGS. 1A and 1B comprise: a dosing surface 102 adjacent to the build surface 105 wherein material is prepared for an accurate dosing and pre-heating; and a recycling chamber 300 adjacent to the build surface 105 on the opposite side of the dosing surface 102 wherein, for example, excess material may be transferred for its reuse or disposal.

Firstly, a pile of build material is transferred from a storage to the dosing surface 102 by appropriate means, such as a feed mechanism 106. Since build material may be powdered or particulate material, the measurement of the amount of build material that is actually transferred from the storage to the dosing surface 102 may be difficult to accurately quantify. It may also be difficult to uniformly locate over the dosing surface 102. This may be further complicated by the fact that build material may have to be transferred rapidly so that its transfer does not affect the processing time of each layer of build material.

In an example, a pile of build material may be laid along the Y axis of the dosing surface 102, by the feed mechanism 106. The build material may be fed to the dosing surface 102, for example, by a choked flow hopper that is moved along a laying axis D1 over the dosing surface 102 by means of a second carriage 107. The build material may be fed to the dosing surface 102, for example, by gravity.

The dosing surface 102 may comprise pre-heating mechanisms below and/or over the dosing surface 102. Therefore, it is useful to uniformly lay the build material over the dosing surface and to accurately determine the amount and height of the layer of build material so that operations like, for example, the pre-heating before the selective solidification are performed adequately.

Once a determined amount of build material has been fed to the dosing surface 102 and the pre-processing operations, for example, the preheating has been performed, a sweep may be performed by the spreader 104 together with the first carriage 103 along a second axis $D_2$ to spread at least part of the build material over the build surface 105. Then, the build material spread over the build surface 105 may be selectively solidified by a printing mechanism and a new pile of build material may be transferred to the dosing surface 102 by the feeding mechanism 106 wherein the feeding of the dosing surface 102 is repeated for a new layer of build material, for example, once the carriage has returned back to its starting position on the left as shown in FIGS. 1A and 1B.

The motion of the first carriage 103 and the second carriage 107 are controlled, in an example, by means of a motion controller 108 that may be connected to a main processing unit. Also, the first carriage 103 and the second carriage 107 may move bi-directionally along a linear trajectory thereby increasing the processing speed and reducing the computational cost on the motion controller 108.

Figure 2:
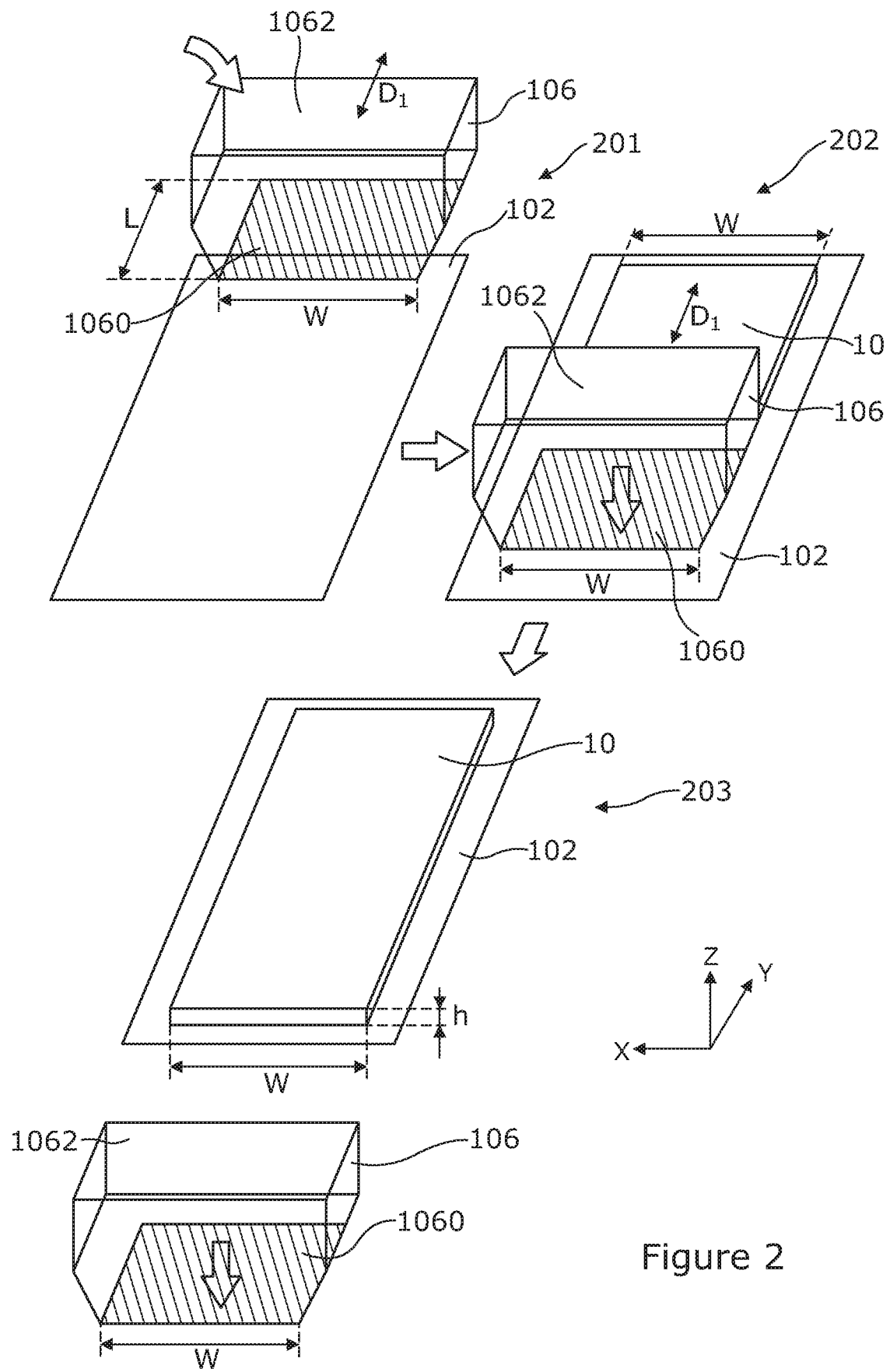
FIG. 2 shows an schematic process diagram for a feeding mechanism according to one example.

FIG. 2 shows a schematic process of a feeding mechanism 106. The feeding mechanism 106 comprises an inlet 1062 for receiving build material 10 and an outlet for feeding a layer build material to the dosing surface 102. The outlet has a quadrangular opening that, in this particular case, is a rectangular opening 1060, in order to feed a substantially rectangular layer of build material on the dosing surface 102. The rectangular opening 1060 may comprise a closing mechanism such as to selectively cover at least part of the opening.

In a first section 201, the feeding mechanism 106 is located at a first position for receiving build material 10, for example, in a receptacle of the feeding mechanism 106. In a second section 202, the feeding mechanism is shown while it moves linearly along a laying axis $D_1$ in a first direction and the rectangular opening 1060 is open such as to feed a layer of build material 10 on the dosing platform 102 as the feeding mechanism 106 follows the laying axis $D_1$. In this example, the layer of build material 10 that is fed to the dosing surface 102 has, in its plan view, a quadrangular shape, in particular, rectangular with a layer width defined by the width W of the rectangular opening 1060.

The result of the feeding of the dosing surface is shown in the third section 203. Therein, a layer of build material 10 is laid with a width W equal to the width of the rectangular opening 1060 and a thickness h that may be determined by height of the outlet, as will be described with reference to FIG. 3. A substantially uniform layer is generated wherein operations, such as, e.g., pre-heating are performed more efficiently, for example since the amount of powder to heat along the length of the pile is substantially constant.

In an example, the 3D printing system 100 comprises a preheating mechanism (not shown) to induce heat from below the dosing surface 102. Additional preheating mechanisms may be incorporated, e.g., from above the dosing surface 102 as to preheat the upper portion of the layer of build material 10.

Figure 3:
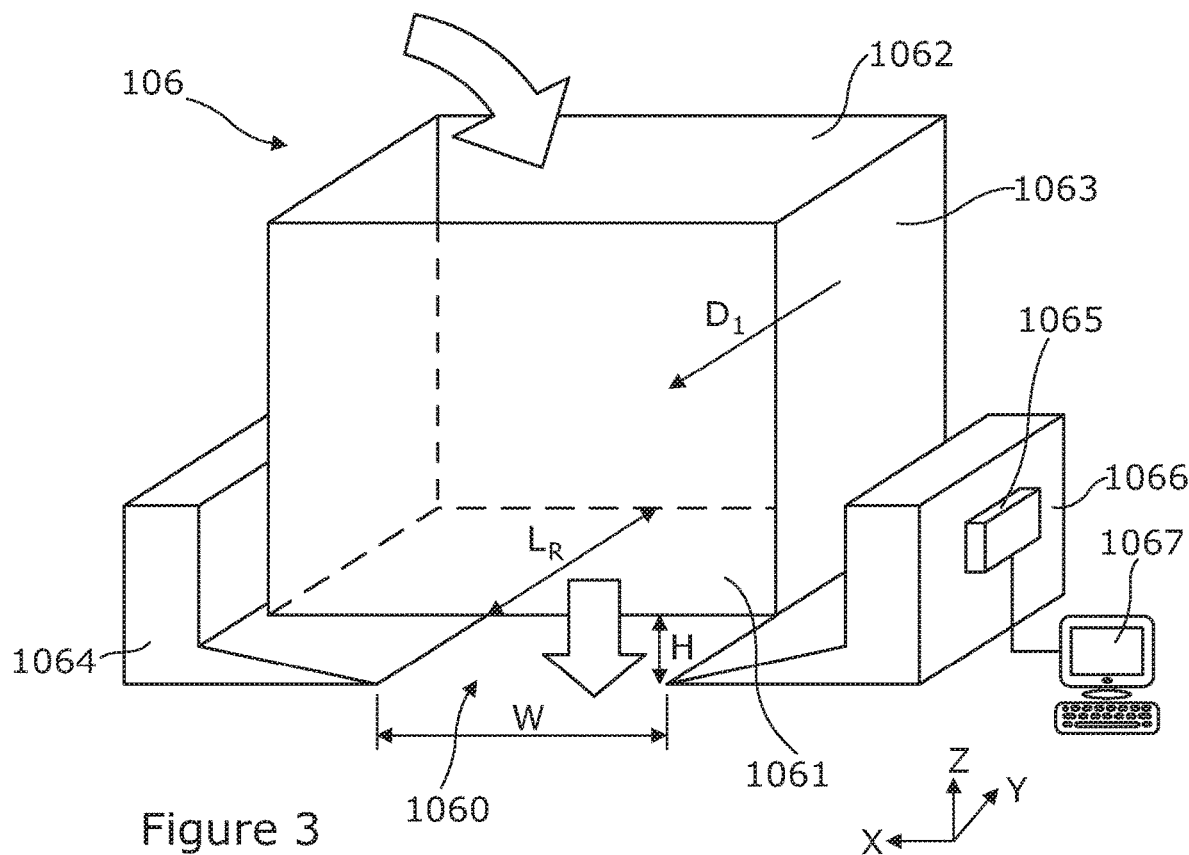
FIG. 3 shows an isometric view of a schematic example of a feeding mechanism.

FIG. 3 shows a schematic example of a feeding mechanism 106. In this example, the feeding mechanism 106 comprises a receptacle 1063 with a top side 1062 that may be selectively open as to receive build material and a bottom side 1061. In an example, the bottom side 1061 may be open as to allow build material to exit the receptacle. The feeding mechanism 106 may comprise an outlet connected to the open bottom side 1061 as to selectively allow build material to exit the receptacle 1063 and go through the outlet so that the build material is fed to a surface, for example, a dosing surface 102.

In the example of FIG. 3, the outlet comprises a first end wall 1064 and a second end wall 1065 that have projecting surfaces below the bottom side 1061 that may cover at least part of the bottom surface 1061 of the receptacle 1063. The end walls thereby define the rectangular opening 1060 for build material to pass through. In this example, the width W of the rectangular opening 1060 is defined by the distance between the projecting surfaces of the end walls and its length by the length $L_R$ of the receptacle 1063.

In a further example, the feeding mechanism 106 may comprise an actuator 1065 coupled to at least one of the first end wall 1064 or the second end wall 1065. The actuator may comprise displacement means as to move the first end wall 1064 and/or the second end wall 1065 in a direction orthogonal to the laying axis $D_1$. The actuator 1065 thereby performs a dimensioning function in directions other than the laying axis $D_1$.

The dimensioning of the outlet is particularly relevant in the context of the feeding mechanism 106 because it provides the feeding mechanism 106, on one hand, with a fine-tune capability on the dosing and, on the other, with flexibility for using a feeding mechanism that can feed layers of several widths on the dosing surface 102.

Since the width of the layer of build material on dosing surface 102 determines the amount of build material that is to be used in a particular 3D printing process, having a feeding mechanism 106 with the capability to determine the width of the build material to be fed to the dosing surface in a single pass is a fast mechanism with low computational cost to define the amount of build material that is used for each layer of the 3D printing process.

In an example, the actuator 1065 may modify the height H of the outlet. For explanatory purposes and in order to maintain the references within the feeding mechanism, the height H of the outlet will be considered to be the distance between the bottom surface 1060 of the receptacle 1063 and the opening 1061. In other examples, the height H can likewise be measured relative to the dosing surface 102.

In a further example, the feeding mechanism 106 may comprise an actuator and mechanical interconnections between end walls so that an action by the actuator is transferred to the first and the second end walls and displaces their position. For example, the first end wall 1064 and the second end wall 1065 may be mechanically coupled so that an action by the actuator 1065 to reduce the width of the output reduces the relative distance between the end walls, e.g., by moving both of them towards each other. Furthermore, the first end wall 1064 and the second end wall 1065 may be mechanically coupled so that an action by the actuator 1066 to modify the height of output is transferred by the mechanical coupling to the end walls so that both of them are simultaneously displaced by the same distance.

In another example, the feeding mechanism 106 may comprise several actuators. The feeding mechanism may comprise one actuator 1065 for each of the end walls or may comprise two actuators for each end wall, e.g., one for modifying the height H of the outlet and one for modifying the width W of the outlet.

Figure 4:
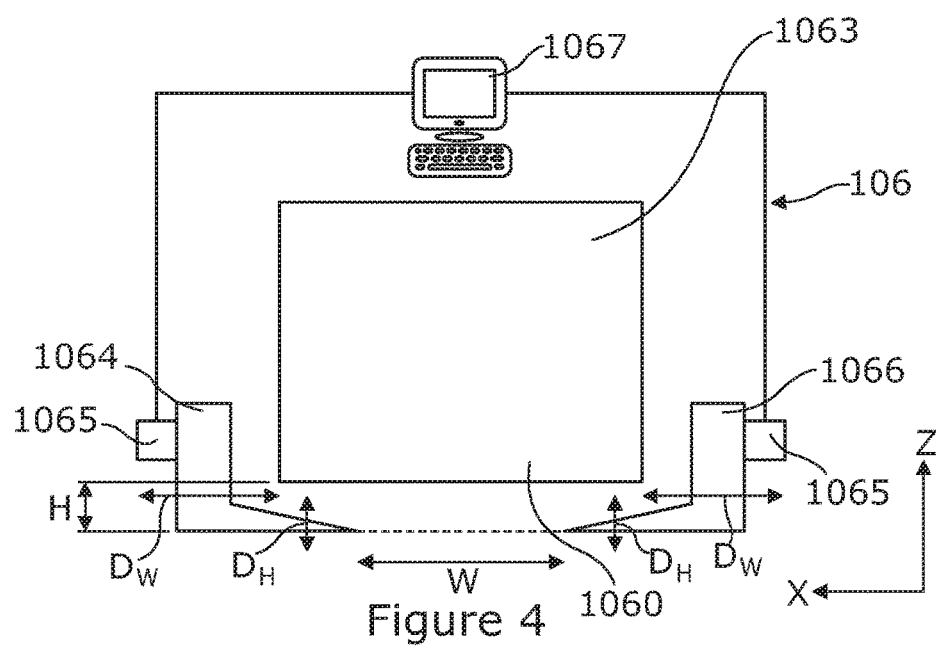
FIG. 4 shows a front view of the feeding mechanism of FIG. 3 according to one example.

FIG. 4 shows a front view of the feeding mechanism 106 of FIG. 3. As mentioned above, the feeding mechanism 106 may comprise end walls that modify the dimension of the rectangular opening 1061. In an example, the feeding mechanism 106 may comprise an actuator 1065 to modify the width W of the outlet, i.e., the opening 1061 by moving in a horizontal direction by a horizontal distance $D_W$. In another example, the feeding mechanism 106 may comprise an actuator 1065 to modify the height H of the outlet by a vertical distance $D_H$. In a further example, the feeding mechanism 106 may comprise one or more actuators 1065 to modify the height H and the width W of the outlet.

The actuator 1065 may be a mechanical actuator, e.g., a lever or any other type of manual mechanism. Alternatively, automatic (or semi-automatic) actuators are envisaged wherein the actuator may comprise a pneumatic or hydraulic mechanism to move the end walls or may be an electric actuator comprising, e.g., a solenoid to move the end walls. In a further example, the actuator 1065 may be a hybrid actuator, for example, a pneumatic actuator wherein the control signal is an electric signal.

Automatic or semi-automatic actuators 1065 comprise an outlet controller 1067 that issues a control signal that is to be received by the actuators and, in response to such control signal, move the end walls.

An automatic actuator is to be understood as an actuator 1065 that is configured to act with no interaction by a user (e.g., based on measurements or on a previous calibration) and a semi-automatic actuator is to be understood as an actuator that, upon receipt of a command by a user (e.g., by issuing a signal or inputting a value on the controller 1067), performs an action.

The outlet controller 1067 may, for example, be configured to determine a quantity of powder to be delivered based on a pre-determined or user-selectable input (e.g. a layer height, material type, etc.). Further, the controller 1067 may be configured to modify the size or height of the opening, e.g., by moving the sidewalls horizontally or vertically. In another example, the controller 1067 may be configured to provide a pile of powder having the chosen width W and thickness h.

In essence, it is disclosed a feeding mechanism for feeding build material to a surface that comprises:
a receptacle to receive build material; and an outlet of the build material having a substantially quadrilateral opening with a first dimension and a second dimension orthogonal to one another;

the outlet further comprising a third dimension orthogonal to the first dimension and the second dimension defining the height of the outlet, and the feeding mechanism being to selectively feed build material from the receptacle through the outlet onto a surface as the feeding mechanism moves along a travel direction over the surface, being such travel direction parallel to the first dimension of the outlet, the feeding mechanism further comprising an actuator to modify the magnitude of at least one of the second dimension or the third dimension outlet.

In an example, the feeding mechanism is coupled to a motor to move linearly along the travel direction. This bidirectional linear movement along a laying axis allows for simpler programming on the controller and lower computational cost on the control algorithms.

The actuator may be configured to modify the second dimension and the third dimension of the outlet. That is, the width and the height of the outlet, which imply, respectively, a change in the width and the thickness of the layer of build material to be fed to the dosing surface.

In an example, the outlet comprises a first end wall and a second end wall separated by a distance defining the second dimension of the outlet, being the actuator to reduce the distance between the first end wall and the second end wall, i.e., the width of the outlet.

In a further example, a first end wall and a second end wall located at the same height, being the actuator to modify by the same magnitude the height of the first end wall and the second end wall. Also, the first end wall and the second end wall may be mechanically coupled as to move jointly.

The feeding mechanism may provide a choked-flow mechanism.

Furthermore, it is disclosed a 3D printing system that comprises:
  a carriage to move over a surface at a determined vertical separation distance; and
  a feeding mechanism to jointly move with the carriage and to selectively feed build material to the surface;
wherein the feeding mechanism comprises a receptacle to store build material and an outlet of the build material, the outlet having a quadrangular opening and having at least a first end wall and a second end wall defining the dimensions of the opening, the feeding mechanism further comprising an actuator to move at least one of the one walls to modify one of: a separation between the first end wall and the second end wall or a separation between at least one of the end walls and the receptacle.

In an example, the carriage is to move linearly along a travel direction and the actuator may be configured to move at least one of the end walls in a direction orthogonal to the travel direction. This is, if the carriage is to move along the Y axis, the actuator may be to move at least one of the end walls along the X and/or Z axis. Also, actuator may comprise means for bi-directional movement of the end walls in directions orthogonal to the travel direction.

In a further example, the first end wall is mechanically coupled to the second end wall as to move simultaneously upon receipt of an action by the actuator.

Also, the feeding mechanism may comprise a cap to selectively close the rectangular opening. The cap may comprise electro-mechanical means for its actuation.

In order to act on the end walls and the cap, the actuator may comprise one of a servomotor, a solenoid, a pneumatic cylinder, or a manually-operated lever.

The invention claimed is:

1. A feeding mechanism for feeding a build material to a surface, wherein the feeding mechanism comprises:
  a receptacle to receive the build material;
  an outlet of the build material having a first L-shaped end wall and a second L-shaped end wall, the first and second L-shaped end walls defining a substantially quadrilateral opening with a first dimension and a second dimension orthogonal to one another, the outlet further comprising a third dimension orthogonal to the first dimension and the second dimension defining a height of the outlet, and the feeding mechanism configured to selectively feed the build material from the receptacle through the outlet onto the surface as the feeding mechanism moves along a travel direction over the surface, the travel direction parallel to the first dimension of the outlet; and
  an actuator to modify a magnitude of at least one of the second dimension or the third dimension outlet by moving at least one of the first L-shaped end wall and the second L-shaped end wall in at least one of a vertical and a horizontal direction.

2. The feeding mechanism of claim 1, wherein the feeding mechanism is coupled to a motor to move linearly along the travel direction.

3. The feeding mechanism of claim 1, wherein the actuator is configured to modify the second dimension and the third dimension of the outlet.

4. The feeding mechanism of claim 1, wherein the first L-shaped end wall and the second L-shaped end wall are separated by a distance defining the second dimension of the outlet, wherein the actuator is configured to reduce the distance between the first L-shaped end wall and the second L-shaped end wall to modify the magnitude of the second dimension.

5. The feeding mechanism of claim 1, wherein the first L-shaped end wall and the second L-shaped end wall are located at a same height, wherein the actuator is configured to modify, by the same magnitude, the heights of the first L-shaped end wall and the second L-shaped end wall to modify the magnitude of the third dimension.

6. The feeding mechanism of claim 5, wherein the first L-shaped end wall and the L-shaped second end wall are mechanically coupled as to move jointly with respect to each other.

7. The feeding mechanism of claim 1, wherein the feeding mechanism provides a choked-flow mechanism.

8. A 3D printing system comprising:
  a carriage configured to move over a surface at a determined vertical separation distance;
  a feeding mechanism configured to jointly move with the carriage and to selectively feed a build material to the surface, wherein the feeding mechanism comprises:
  a receptacle configured to store build material;
  an outlet of the build material, the outlet having a first L-shaped end wall and a second L-shaped end wall, the first and second L-shaped end walls defining a quadrangular opening and having at least a first end wall and a second end wall defining dimensions of the opening; and
  an actuator configured to move at least one of the first L-shaped end wall and the second L-shaped end wall to modify at least one of a separation between the first L-shaped end wall and the second L-shaped end wall or a separation between at least one of the first L-shaped end wall and the second L-shaped end walls and the receptacle.

9. The system of claim 8, wherein the carriage is to move linearly along a direction.

10. The system of claim 9, wherein the actuator is configured to move at least one of the first L-shaped end wall and the second L-shaped end wall in a direction orthogonal to the travel direction.

11. The system of claim 9, wherein the actuator comprises means for bi-directional movement of the first and second L-shaped end walls in directions orthogonal to the travel direction.

12. The system of claim 8, wherein the first L-shaped end wall is mechanically coupled to the second L-shaped end wall as to move simultaneously with the second L-shaped end wall upon receipt of an action by the actuator.

13. The system of claim 8, wherein the feeding mechanism comprises a cap to selectively close the quadrangular opening.

14. The system of claim 8, wherein the actuator comprises one of a servomotor, a solenoid, a pneumatic cylinder, or a manually-operated lever.

15. The system of claim 8, wherein the outlet allows for build material to flow from the receptacle through the quadrangular opening by gravity.

* * * * *